United States Patent
Derbez

(10) Patent No.: US 9,733,360 B2
(45) Date of Patent: Aug. 15, 2017

(54) JOINT PROCESSING OF GNSS PSEUDORANGE SIGNALS

(71) Applicant: iPosi, Inc., Denver, CO (US)

(72) Inventor: Eric Derbez, Vancouver (CA)

(73) Assignee: iPosi, Inc., Denver, CO (US)

( * ) Notice: Subject to any disclaimer, the term of this patent is extended or adjusted under 35 U.S.C. 154(b) by 552 days.

(21) Appl. No.: 14/285,770

(22) Filed: May 23, 2014

(65) Prior Publication Data

US 2015/0338519 A1 Nov. 26, 2015

(51) Int. Cl.
*G01S 19/09* (2010.01)
*G01S 19/13* (2010.01)
*G01S 19/03* (2010.01)
*G01S 19/20* (2010.01)
*G01S 19/23* (2010.01)
*G01S 19/51* (2010.01)

(52) U.S. Cl.
CPC .............. *G01S 19/13* (2013.01); *G01S 19/03* (2013.01); *G01S 19/20* (2013.01); *G01S 19/23* (2013.01); *G01S 19/235* (2013.01); *G01S 19/51* (2013.01)

(58) Field of Classification Search
CPC ................................ G01S 19/13; G01S 5/0027
USPC ............ 342/357.25, 357.46, 357.51, 357.71; 701/412, 475
See application file for complete search history.

(56) References Cited

U.S. PATENT DOCUMENTS

| | | |
|---|---|---|
| 2004/0130484 A1 | 7/2004 | Krasner |
| 2009/0237302 A1 | 9/2009 | Derbez et al. |
| 2010/0176990 A1 | 7/2010 | Green et al. |
| 2011/0187590 A1* | 8/2011 | Leandro ............... G01S 19/43 342/357.27 |
| 2012/0286991 A1* | 11/2012 | Chen .................. G01S 19/04 342/357.23 |
| 2013/0321202 A1 | 12/2013 | Lin et al. |

FOREIGN PATENT DOCUMENTS

WO 2008085220 7/2008

* cited by examiner

*Primary Examiner* — Dao Phan
(74) *Attorney, Agent, or Firm* — Marsh Fischmann & Breyfogle LLP

(57) ABSTRACT

An approach to joint processing of GNSS signals to determine a receiver location and common mode bias associated with grouped records corresponding to GNSS signals. In this regard, a receiver may acquire signals from a GNSS space vehicle over a relatively long period of time. In turn, records corresponding to received signals may be stored and grouped. The grouping of records may be based on assumptions of a common-mode bias for certain records (e.g., records acquired within a given duration of an observation time period). Upon acquisition of a suitable number of records, an over-determined system may be established that is used in iterative processing to solve for location and/or bias values associated with the respective common-mode bias for each group of records. As such, improved receiver performance may be realized.

22 Claims, 2 Drawing Sheets

JOINT PROCESSING OF GNSS PSEUDORANGE SIGNALS

FIELD

The present disclosure relates to processing of Global Navigation Satellite Services (GNSS) signals (e.g., GPS signals), and in particular to joint processing of pseudorange data for trilateration to determine a receiver location in an environment where receipt of four or more simultaneous signals may not be achieved (e.g., in a building or the like).

BACKGROUND

Global satellite navigation fulfills pervasive needs. Initially a service for military and general aviation, Global Navigation Satellite Services (GNSS) have expanded into many commercial and consumer products for applications ranging from casual to emergency services. More recently, cellular phones have been developed that provide location based service applications and, in response to government requirements, emergency caller location services. The preponderance of these services is enabled by the US Air Force managed Global Positioning System (GPS). GPS is now or may soon be joined by several additional GNSS systems including: GLONASS (Russia), Galileo (European Space Agency), Quasi-Zenith Satellite System (Japan), the Regional Navigational Satellite System (India), and the BeiDou navigation satellite system (China).

The utility of exact positioning cannot be overestimated when safety and security is involved, and several governments now seek precise location for their respective countries' public communication and first-responder infrastructure. At the same time that they seek this service, their public communication infrastructure is shifting rapidly from fixed circuit switched networks to alternative communication networks such as, for example, Voice Over Internet Protocol (VoIP) networks or other Internet Protocol (IP) networks. However, current IP networks are not geo-referenced to either intelligently route or pinpoint the location of E911 callers or others seeking emergency services or the like. Further, such IP services are generally portable to provide nomadic connectivity.

In this regard, to support the ability to locate IP devices (e.g., including the VoIP-enabled emergency caller), proposals have been offered to provide location information by, for example, manual surveys or mapping of the underlying fixed plant assets, using parasitic methods by acquiring and mapping signals such as WiFi or TV broadcast signals, or new, dedicated signals, using separate spectrum and infrastructure that are deployed for the sole purpose of locating objects, pets, or people. However, these methods may have limited effectiveness, may require service suspension if the user connects at a new location, and may incur additional mapping costs when the user connects at a new location. A common belief or premise of these proposals is GPS cannot operate successfully to reach receiver points located inside buildings and homes due to limits of effective satellite signal sensitivity. This limitation is often attributed to the fact that the satellites are far away and have comparatively limited transmission power. However, given the pervasiveness and existing infrastructure in place with respect to GNSS and especially GPS systems, it is highly desirable to improve the ability for devices to employ GPS in obtaining location information even in the case of difficult environments such as where a receiver is located within a building.

SUMMARY

In view of the foregoing, the present disclosure relates to improved receiver performance in a GNSS system. The approaches described herein may facilitate improved performance for receiver, and in particular improved performance for receivers with limited reception of satellite signals. For instance, receiver performance may be increased where the receiver is located in a building or the like. As such, the present disclosure may provide improved functionality to receivers to facilitate improved location determinations for devices such as, for example, VoIP, IP network devices, or other devices to be located using received signals from a satellite positioning system.

For example, many IP network devices may be stationary. Thus, an assumption may be made that the device to be located is stationary for a longer duration than in traditional GNSS approaches. In turn, stationary devices may leverage time-spread acquisition methods to acquire a plurality of signals over a longer period of time than is used in traditional approaches to acquiring satellite signals. However, as the period of time over which signals are acquired increases, the potential for varying biases in the acquired signals also grows. Without provisions to account for and/or correct such biases, use of time-spread acquisition methods may result in inaccurate and/or imprecise location determinations.

Accordingly, approaches described herein may include determining a bias of the signals received at a receiver. The signals may be acquired over a relatively long duration (e.g., over a period of time spanning a plurality of traditional GPS epochs). Different discrete portions of the period over which signals are acquired may each have a unique bias. As such, each bias may be determined using a joint processing approach as described herein to allow for correction when processing the signals (e.g., to determine a location of the receiver). Signals that are acquired over a relatively long period of time (e.g., minutes, hours, or even days) may then be used in conjunction to accurately locate the device. When determining the bias of signals received, a duration of an observation period may be established such that it may be assumed that signals received during the observation period are subject to a common-mode bias. The common-mode bias may represent multiple sources of bias including, for example, one or more biases introduced at the space vehicle (SV), one or more biases introduced at the receiver, and/or one or more biases associated with the propagation of the signal from the SV to the receiver.

In any regard, signals received at the receiver during any given one duration may be grouped and assumed to have a common-mode bias. In this regard, the signals received over one or more observation periods (e.g., that may span a relatively long period of time as compared to traditional GPS approaches) may be stored as grouped records that at least include a pseudorange determined from the signals. The records may also be attributed with a common-mode bias value that is assumed to be the same for each record in a given group. As such, the records including the pseudorange and the bias value may be used to calculate the location of the device and the one or more bias values. For instance, the calculation may include an algorithmic approach whereby the difference between the pseudorange value and a measured error is equated to the corresponding bias value for the record. In this regard, a plurality of signals may be acquired such that sufficient inputs are obtained to achieve a determined or over-determined system. In turn, variables in the system (e.g. the location and bias values) may be solved by way of iterative calculation. Accordingly, given the bias values for each record in each group may be solved for, each record may be corrected to remove the bias value so that records spanning a relatively long period may be used in conjunction to determine the device position.

Accordingly, a first aspect includes a method for a receiver used with a positioning system. The method may include establishing a duration of an observation time period such that signals received from the positioning system at the receiver within the duration of the observation time period may be subject to a common-mode bias. The method may further include saving a plurality of records for at least one observation time period, where the plurality of records each correspond to a corresponding signal received at the receiver from the positioning system during the duration of the at least one observation time period. The method may further include solving for the common-mode bias corresponding to the observation time period using the plurality of records for the at least one observation time period.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, in an embodiment, the receiver may be stationary. Thus, a time-spread approach may be employed such that signals one acquired of the stationary receiver over a relatively long period of time (e.g., longer than traditional approaches to GPS signal acquisition periods). Furthermore, the method may include assuming the receiver is stationary over a relatively long duration (e.g., a plurality of GPS epochs that may span hours or days). This assumption may be reasonable given the nature of many IP devices or other embedded receivers located within a building are generally stationary in nature (e.g., VoIP devices, IP infrastructure devices, or the like).

In an embodiment, the duration of the observation time period may be at least partially determined based on a stability measure of a local oscillator at the receiver. That is, a known stability of the oscillator (e.g., an Allen variance) may be utilized to assist in determining the duration over which a reasonable assumption regarding the common mode bias of signals is made. Accordingly, the duration of the observation time period may be at least partially based on a predetermined precision measure, whether associated with a local oscillator or some other precision measure that provides information regarding signal bias. For example, a statistically derived measure of a bias may be utilized to determine the duration of the observation time period. In this regard, the statistically derived measure may characterize the bias even if the exact value and/or magnitude of the bias is unknown. It may be appreciated that a plurality sources of bias may be present. In this regard, other factors (e.g. known biases or statistically derived estimates of a bias may be used in determining the optimum duration of an observation window for the purposes of assuming a common mode bias that results in an acceptable level of precision of the resulting location determination).

In that solving for the common mode bias for the observation time period may provide information regarding a clock error in a case where the local oscillator affects the bias, upon solving for the common mode bias for an observation time period, the common-mode bias may be used to correct an error in the local oscillator. That is, if a bias value is determined and assumed occur based on a local oscillator error, the common mode bias may be equated to an offset error in the local oscillator. In turn, the local oscillator may be corrected (e.g., the frequency of the local oscillator may be adjusted to account for a frequency drift and/or a phase correction of the local oscillator).

In an embodiment, the solving operation may also include determining a set of predicted pseudorange errors. In turn, the method may further include equating the predicted pseudorange errors to a corrected change in position as determined based on the signals received during the observation time period. As such, the method may include calculating the common-mode bias by solving for a common-mode bias term or bias value to maintain equality between the predicted error and the corrected change in position.

In an embodiment, the saving operation may also include saving a plurality of groups of records each corresponding to a plurality of observation time periods. Each of the records in each respective one of the plurality of groups correspond to a signal at the receiver from the positioning system during a corresponding one of the observation time periods. Each record of a respective group of the plurality of groups of records may include (or be assumed to have) a common-mode bias value. In this regard, the solving operation may further include solving for the common-mode bias value for each of the plurality of groups using corresponding records from each of the plurality of groups of records.

The plurality of records for each of the plurality of groups may be stored in a circular buffer. As such, the plurality of records for the oldest observation time period may be overwritten by a plurality of records for a new observation time period during each successive observation time period. In any regard, the groups may correspond to a relatively long time span corresponding to a span of hours or days. For example, the plurality of observation time periods may extend over a period of not less than 4 hours. In an embodiment, the plurality of observation time periods may extend over a period of not less than 24 hours. Furthermore, the period over which observation time periods span may be a function of the geometry of a space vehicle. For example, a space vehicle with a given horizon to horizon time pass may be used to determine the period over which the observation time periods extend. Furthermore, the duration of an observation time period may be at least partially based on space vehicle parameters and/or characteristics. In any regard, a time-spread approach may be facilitated.

In an embodiment, the method of the first aspect may further include applying a Receiver Autonomous Integrity Monitoring process to each of the plurality of observation time periods to remove at least one record from the plurality of records. The removed record corresponds to a fault associated with a received signal from the positioning system. Thus, the record may correspond to an outlier that may be identifiable and removed from consideration when solving for the common-mode bias. The RAIM processing is enabled by an over-determined system. In that inputs to the system may be acquired over a plurality of observation time periods to achieve the over-determined system, an outlier, or faulty signal may be determined for a given observation time period with as few as two signals. Thus, the RAIM processing that may be used in the method of the first aspect may facilitate improved recognition of signals with faults (e.g., a faulty signal may be identified for an observation time period with as few as two signals).

Given the observation time periods may span a relatively long time, the receiver may receive signals from one or more space vehicles over the relatively long duration. This may assist in achieving a relatively low geometric dilution in precision. For example, even with a single space vehicle, signals may be received as the space vehicle passes from horizon to horizon or over some portion of the space vehicle's trajectory over a period of time. As such, given that signals may in turn be received from a space vehicle in a number of different orientations relative to the receiver, the geometric dilution of precision may be reduced. In an embodiment, the dilution of precision measure for a location determined utilizing the signals received at the receiver from the positioning system and the common-mode bias information for the plurality of observation time periods may be less than 1.

In an embodiment, the method may include compensating the signals received during the observation time period using the solved common-mode bias for the observation time period to generate corrected signals. In turn, the method may include utilizing the corrected signals to resolve a position of the receiver. That is, once the common mode bias for each group of records is determined, the resulting location error based on the solved common mode bias may be used to correct the error introduced by way of the bias. In an application, the utilizing may include the use of corrected signals from a plurality of observation time periods, thus allowing for the benefits derived from a time-spread observation.

In an embodiment, the receiver may further receive donated signals from other receivers that may be in communication with the receiver to be located. In turn, adjacent receivers (e.g., that may have better reception capabilities due to the relative location of the adjacent receivers to the receiver to be located) may provide such donated signals to the receiver. As such, the method may further include receiving, at the receiver from an adjacent receiver, a plurality of donated signals received at the adjacent receiver. Each of the plurality of donated signals may be grouped into a common observation time period subject to a common-mode bias of the adjacent receiver. In turn, the solving may include solving for the common-mode bias of the plurality of donated signals from the adjacent receiver. The common-mode bias attributed to the donated signals may account for biases at the adjacent receiver, during communication of the signals from the space vehicle to the adjacent receiver, and/or during communication of the donated signals from the adjacent receiver to the receiver to be located (e.g. including bias resulting from an offset in clocks of the adjacent receiver and the receiver to be located).

The proximity of the adjacent receiver to the receiver to be located may be ascertained via a communication channel between the receiver and the adjacent receiver. For example, the position of adjacent receivers relative to the receiver may be determined by way of a received signal strength indicator (RSSI). Additionally or alternatively, the position of adjacent receivers relative to the receiver may be known. In any regard, the method may include receiving, at the receiver from the adjacent receiver, a plurality of donated signals received at the adjacent receiver at a subsequent time. The adjacent receiver may be at a different location at the subsequent time and the different location may be related to a prior location of the adjacent receiver by way of integration of inertial measurements. The method may further include receiving, at the receiver from a plurality of adjacent receivers, a corresponding plurality of donated signals received at the respective adjacent receivers. The plurality of adjacent receivers positions offset relative to the receiver may be known from wireless ranging.

In an embodiment, the adjacent receiver may be time synchronized with the receiver. That is, the donated signals from the adjacent receiver may be received in relation to a synchronized clock of the receiver. This may assist in reducing the magnitude in the bias of the donated signals. However, even if the adjacent receiver is not synchronized, the offset between the oscillator at the adjacent receiver and that of the receiver to be located may be accounted for in the common mode bias that may be attributed to the signals provided by the adjacent receiver as described above. That is, the lack of synchronization between the adjacent receiver and the receiver to be located may be accounted for in the common mode bias attributed to the donated signals.

DETAILED DESCRIPTION

Figure 1:
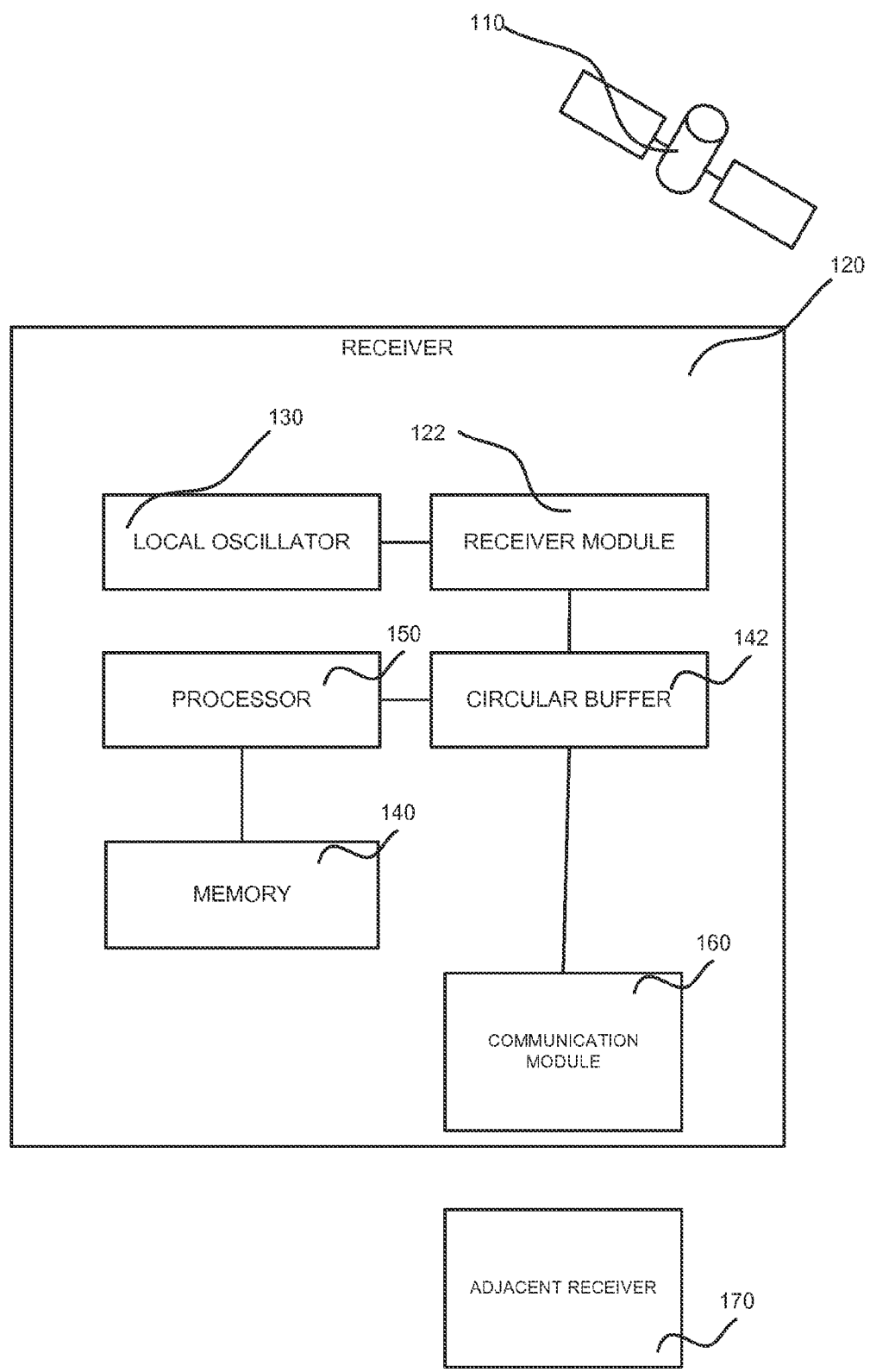
FIG. 1 is a schematic view of an embodiment of a receiver.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Traditional GNSS systems such as, for example, GPS must acquire four simultaneously received signals from four corresponding space vehicles (SVs) to determine a location. In this regard and as is well known in the art, such prior systems generally operate by utilizing a receiver to receive signals from the four SVs. These signals include, amongst other potential information, a location reference and time reference for the SV broadcasting the signal. In turn, the receiver may determine the difference between the time reference contained in the signal and a time measure at the receiver to compute a distance (i.e., a pseudorange) to each satellite using the speed of light. Each pseudorange may define a sphere relative to the location data provided by the satellite. Trilateration may be used to determine the intersection of the spheres defined by the satellite locations and pseudoranges using the navigation equations known in the art. In this regard, the use of four simultaneously received signals corresponding to four pseudoranges may provide a determined system whereby errors such as those related to errors in the receiver's local time measure may be determined and/or corrected. An over-determined system can be constructed with acquisition of five or more simultaneous signals. As such, traditional GPS systems may utilize relatively inexpensive oscillators that may be subject to drift or other errors that introduce inaccuracies into the time measure of the local oscillator, which may be accounted for and corrected by acquiring four or more signals to provide a determined or over-determined system.

However, difficulties may arise in acquiring four or more simultaneous signals from four or more SVs. In particular, in the case of an in-building receiver, such as a device located deep in-building (e.g., a VoIP device, IP connected device, or the like), the number of signals the receiver may instantaneously detect may be limited to less than four. See for example "Calculating Time to First Fix", GPS World, p. 29-34, November 2011, Peter Duffett-Smith et al, in which the strengths of indoor signals are studied and one conclusion is that there may typically be only two strong signals with other signals having "fades" of 20 to 30 dB. Therefore, in these scenarios traditional methods for determining the position of the receiver may be unavailable or result in an unacceptable level of precision, especially in the context of the provision of emergency services.

In turn, approaches are described herein that may provide alternative approaches to location determination for receivers with limited reception capabilities (i.e., receivers that are incapable of receiving the traditional four or more simultaneous signals for determination of a corresponding four or more pseudoranges). Some prior approaches are discussed in U.S. Pat. No. 7,961,717, which is co-owned by the present applicant and hereby incorporated by reference in its entirety. Specifically, one approach to improving location determination for receivers with limited reception of SV signals has been a time-spread approach to signal acquisition. In short, a time-spread approach may assume a receiver is stationary over a given period. Such an assumption may be made for many types of devices such as, for example, IP devices, VoIP devices, or the like that may be located in a building. In turn, pseudoranges acquired over a time may be processed to arrive at a location with the assumption that the receiver has not moved between the time the various pseudoranges used in the processing are acquired. As such, assuming the receiver is stationary may substantially increase the likelihood of resolving a location fix, especially in cases where conditions prevent a minimum of four simultaneously acquired satellites. This approach also allows improved accuracy by extending observation time to capture more satellites at different geometrical positions to produce higher quality position fixes (e.g., pseudoranges over a larger time spread may have a reduced geometric dilution of precision (GDOP)). In turn, receivers may cumulatively compile more time-spread measurements when as few as one GNSS satellite signal is available per acquisition session.

The time-spread approach to signal acquisition may also be used to extend the number of independent GNSS signal measurements to further improve accuracy otherwise reduced by less than favorable signal levels, where there is less than optimal geometry, where multi-path signal distortion is present, or in cases where dominant GNSS signal jamming masks weaker signals. These cases arise normally in the case of in-building located receivers, where such receivers are either cable-connected inside a network plant, or are linked by a short range wireless access point and the access point is stationary (and a position can be conferred based on the remote receiver being embedded inside the wireless access point a short distance away). By spreading time of observation, additional signal processing gain is generated relative to conventional "snapshot" acquisition receivers (wherein the devices may be pre-positioned).

To extend the receiver signal measurement time and not introduce excessive errors, a key aspect is to control the value of errors introduced in the signal. As may be appreciated, as the time-spread approach is used over longer overall durations, the susceptibility to and rate of errors may increase. For instance, a receiver oscillator drift and resulting clock bias may adversely affect time-spread measurements. Additional sources of bias in a pseudorange may also be present such as, for example, physical parameters (e.g., varying atmospheric effects on the propagation of the signal) or processing errors. Such biases may be introduced at the SV, at the receiver, or during signal propagation from the SV to the receiver. Biases may be defined as any error that cause observed measurements to vary from a true measurement. It will also be appreciated that the system biases may not be constant. Rather, the biases imparted to a signal may change over time and may not be predictable. In this regard, even if a bias may be determined at a first time, a second time different than the first time may be subject to a bias different than the bias present at the first time. Thus, it is advantageous to record any such bias and correct for it at each GNSS signal acquisition event.

Some prior approaches may attempt to correct certain biases such as the clock bias introduced as a result of discrepancies between the receiver's local time measure and the GNSS system's clock. For example, to control clock bias, some prior approaches rely on connectivity that allows for communication of time/frequency dissemination. That is, time and/or frequency information may be communicated to the receiver to allow for any clock bias to be corrected. Such approaches include assisted GPS (A-GPS) whereby a receiver may be in direct (e.g., line-of-sight) communication with a time referenced module and/or systems where the receiver is in communication over an indirect connection such as an IP network or the like. However, such approaches may rely on connectivity between the receiver and a remote location for time/frequency dissemination. Furthermore, the correction of clock bias at the receiver may not be the only bias present in the system at any given time. As such, additional processing is advantageous to further determine and/or correct for biases.

Accordingly, the approach described herein provides for grouping pseudoranges such that all pseudoranges in a group may be characterized as having a single common-mode bias. As such, the single common-mode bias may account for any bias present at the time pseudoranges in any given group are acquired. That is, the single common-mode bias may include bias from any one or more sources (e.g., including biases originating at the SV, the receiver, and/or from propagation of the signal). The pseudoranges may be grouped based on acquisition during a common observation time period. The duration of the observation time period may be established such that the assumption that all pseudoranges acquired during the duration are subject to the same common-mode bias. In turn, as will be appreciated from the following discussion, the grouping of pseudoranges into groups of common-mode bias may allow for the location of the receiver and the values for the common-mode bias for each group of pseudoranges to be determined by establishing a determined or an over-determined system and iteratively solving for the location and bias variable established in the system. Accordingly, the approach described herein may allow multiple measurements spanning hours, days or even longer periods to be processed together to compute a location of a receiver because the respective common-mode biases for each group of pseudoranges may be determined such that biases of the pseudoranges may be accounted for in determining location such that varying biases occurring in different acquisition times may be accounted for to produce an accurate location information even from signals acquired at different times.

An embodiment of a receiver 120 described herein is shown in FIG. 1. The receiver 120 may include a processor 150 in operative communication with a memory 140. The processor 150 may be a microprocessor capable of accessing non-transitory machine readable data stored in the memory 140. In turn, the processor 150 may be operable to execute the non-transitory machine readable data to control the operation of the receiver 120 in a manner described below. The processor 150 may also include one or more field programmable gate arrays, application specific integrated circuits, or the like.

Furthermore, the receiver 120 may include a receiver module 122 that may include software and/or hardware capable of receiving GNSS signals from the SV 110. The receiver module 122 may include an antenna capable of receiving the signals from the SV 110. As may be appreciated, bias may also be introduced into a signal at the SV 110 and/or during propagation of the signal between the SV 110 and the receiver module 122. The receiver module 122 may be in operative communication with a local oscillator 130.

The processor 150 may also be in operative communication with the local oscillator 130. However, while the receiver module 122 and processor 150 may utilize a common local oscillator 130, this need not be the case and separate oscillators may be provided. The local oscillator 130 may provide a clock signal to the receiver module 122 used in the operation of the module 122. In this regard, the local oscillator 130 may provide the clock signal used by the module 122 to maintain a local time measure at the receiver 120. As may be appreciated, the local time measure may be used at the receiver 120 to compute pseudoranges from GNSS signals received at the receiver 120 from a SV 110. Accordingly, errors (e.g., frequency offset or drift) in the local oscillator 130 may result in an inaccurate local time measure that may, in turn, introduce bias into pseudoranges calculated using the local time measure.

The receiver module 122 may be in operative communication with a circular buffer 142 for storage of signals and/or records associated with received signals. The circular buffer 142 may store records corresponding to the most recently acquired signals in the circular buffer 142 such that the records associated with the oldest received signals are continually overwritten by the newly acquired records. Thus, the records maintained in the circular buffer 142 may continually refresh as newly acquired signals are received at the receiver module 120.

Figure 2:
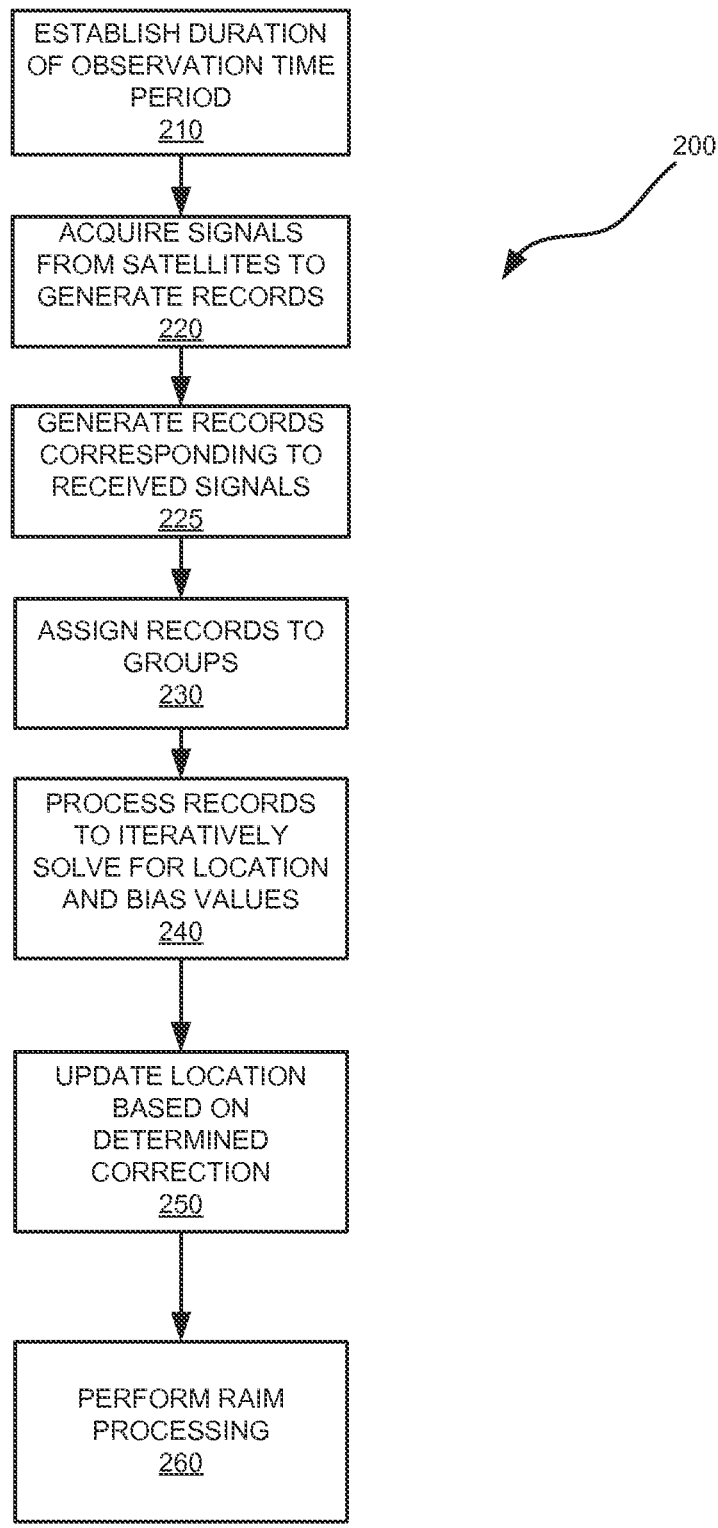
FIG. 2 is a flow chart representation of an embodiment of a method for joint processing of signals.

The memory 140 may include one or more modules that when executed by the processor 150 may be operative to process one or more records stored in the circular buffer 142. For example, the processor 150 may be operative to execute an embodiment of a method 200 for joint processing of pseudoranges is depicted as a flow chart in FIG. 2. The method 200 may include establishing 210 a duration of an observation time period. Specifically, the duration of the observation time period may be established 210 such that an assumption may be made that all pseudorange errors acquired during the observation time period are subject to the common-mode bias. That is, a duration of the observation time period may be sufficiently short to assure all signals received in the period are affected by a common bias during the period.

One such approach for establishing 210 the duration of the observation time period includes utilization of characteristics of a local oscillator 130 to determine a period within which the oscillator 130 is sufficiently stable to safely assume that a given precision may be provided for in determining pseudoranges using a time measure based on the local oscillator 130. That is, a given local oscillator 130 may experience varying stability that may be characterized statistically (e.g., in the form of an Allan variance or the like). As such, it may be recognized that a given amount of instability of the oscillator may in turn provide an increase in the pseudorange error imparted as a result of the clock bias used to determine the pseudorange. Specifically, the stability of the oscillator 130 and the pseudorange error are correlated to the speed of light (i.e., the speed of propagation of the signal). In turn, the stability of the oscillator 130 considered in connection with a given duration of time relative to the speed of light may determine the amount of pseudorange error.

In a specific example, the duration (W) of the observation time period may be established 210 at least partially based on the stability of the local oscillator (S), the maximum allowed pseudorange error (E), and the speed of light (C). In this regard, the duration of the observation time period may be provided by the equation:

$$S*W*C*1e^{-9}<E \qquad \text{Equation 1}$$

A local oscillator may be stable to within 0.1 part per billion (S=0.1), and the maximum allowed pseudorange error may be 9 meters (E=0.9 m). As such, the duration (W) of the observation time period may be calculated as:

$$W = \frac{E}{S*C*10^{-9}} \qquad \text{Equation 2}$$

or $$W = \frac{9 \text{ m}}{0.1*\left(3*10^8 \frac{\text{m}}{\text{s}}\right)*10^{-9}} = 300 \text{ s}$$

That is, in the provided example, for an oscillator 130 that is stable to within 0.1 parts per billion, and a maximum allowed pseudorange error to be 9 meters, the duration for an observation time period wherein all pseudoranges derived during the observation window can be assumed to be subject to the same common mode bias is 300 seconds. Thus, the duration for the observation period may be computed based on a number of factors including, for example, the maximum tolerable error in a given pseudorange and the stability of the oscillator 130.

The method 200 may also include acquiring 220 GNSS signals from one or more SVs 110 and generating 225 records corresponding to the received signals. In turn, a set of records for each signal may be saved. The record may comprise a pseudorange derived from the signal (e.g., using the navigational equations known in the art to derive a distance based on a time reference and location reference contained in the signal relative to a time measure at the receiver), a Doppler correction value, time reference, a location reference of the source at the time of the time reference, one or more source clock correction values, one or more atmospheric delay parameters, or the like. It should be noted that minimally, the record should include source identification (e.g., satellite ID), pseudorange, and time reference. The time reference may be accurate enough to establish the ranging satellite's position to within a few meters (an absolute accuracy of 1 milli-second for GNSS satellites is sufficient).

The method 200 may also include assigning 230 records into a group. Specifically, the records may be assigned 230 to a group based on the time reference of the record such that all records corresponding to a time reference falling within a common observation time period are grouped. As described above, the duration of the observation time period is determined such that records falling with a common observation time can be assumed to have a common-mode bias. That is, during each duration of the observation time period, records whose corresponding signals were acquired during the observation time period may be correlated to a group of records for the observation time period. As discussed above, the grouped records may be stored in a circular buffer 142 such that oldest records in the circular buffer may be overwritten by newly acquired records.

Accordingly, the receiver 120 may process 240 the grouped records to solve for the common mode bias for each group of records. The processing 240 may, for example, occur at idle times for the receiver 120 (i.e., where no acquisition or other processing is occurring). Specifically, the processing 240 may include establishing characterizing equations for each observation time period, wherein the pseudorange calculation for pseudoranges in a given observation period are processed with a single common-mode bias value. In turn, the processing 240 may include equating a predicted pseudorange error to a corrected change in position as determined based on the signals received during the observation time period. In turn, the processing 240 may include calculating the common-mode bias by collecting a sufficient number of records to establish a determined or an over-determined system. Thus, the processing 240 may include iteratively solving for a common mode bias value to maintain equality between the predicted error and the corrected change in position. That is, the equations may characterize any discrepancy between and actual location and a measured location as the bias value. Accordingly, the variables associated with the actual location and respective bias values of the groups of records may be iteratively solved using any known mathematical processing technique known in the art including, for example, a least squares batch process or via a Kalman filter. In this regard, the processing may include vector processing and/or scalar processing for the separate dimensions (e.g., x, y, z, dimensions as well as the bias value(s)) to be solved.

In one particular example, the processing 240 may include describing the relation between a pseudorange ($\rho_i$) of a record relative to a bias value ($b_k$) using the equation:

$$\rho_i - |X_{sat}(i) - X| = d\cos_i \cdot \Delta X + \text{correction terms} + b_k \quad \text{Equation 3}$$

In Equation 3, $\rho_i$ represents a pseudorange value of a record i, $X_{sat}(i)$ represents the location reference of the satellite of record i, and X represents the location of the receiver. Furthermore, $d\cos_i$ is a direction coefficient that may be defined as:

$$dcos_i = \frac{X_{sat}(i) - X}{|X_{sat}(i) - X|} \quad \text{Equation 4}$$

In Equation 3, $\Delta X$ represents a correction to the a priori receiver position given the corresponding measured pseudorange minus predicted pseudorange. The value correction terms may include, for example, known or provided satellite clock corrections, atmospheric corrections, earth rotation corrections, or other correction terms given by correction equations known in the art. Furthermore, $b_k$ may represent the common-mode bias for all pseudoranges belonging to a common bias group. That is, all pseudoranges grouped according to a given observation time period may have the same bias value $b_k$.

As such, Equation 3 may be used for all records i=1, . . . , $N_k$ where the common-bias value $b_k$ is described as $1 \leq k \leq B$, B describing the number of biases in the set of records. As such, Equation 3 may be utilized for each record in a group across all groups of observed time periods. In this regard, the number of records processed may allow for establishment of an over-determined system whereby the number of variables (e.g., the position of the receiver and the unknown bias values for each group) may be iteratively solved by processing each record for each group to converge on a solution. That is, for a total number of records M, The processing may continue as new records are added to the circular buffer to overwrite the oldest records. Thus, after each iteration, the method 200 may include updating 250 the value of X using the equation X=X+$\Delta$X. Furthermore, the last bias $b_k$ will give the receiver's bias at the time of the last bias group.

Further processing may also be performed using the grouped records having common single mode biases. For instance, the method 200 may include performing 260 a receiver autonomous integrity monitoring (RAIM) process to detect and remove records subject to error (i.e., outliers). In this regard, RAIM generally refers to a process of detecting pseudoranges that differ significantly from other pseudoranges such that outliers that correspond to a fault may be identified. Traditional approaches to RAIM rely on acquisition of redundant pseudoranges in a common epoch to determine outliers. However, as applied in the method described herein, RAIM may be used to identify and eliminate outlier records from consideration. As such, in each iteration of the RAIM processing 260, a single record may be removed from consideration. For instance, in a first iteration applied to M total records, the first iteration may eliminate a single record to determine the best M-1 records. This iterative process may continue until a desired residual value is reached.

The RAIM processing 260 applied to the grouped records may also allow for fault detection with fewer records than is typically required for RAIM processing. As four pseudoranges are traditionally needed to obtain a location fix for a receiver, in traditional RAIM approaches at least six pseudoranges are needed to correctly identify an outlier. Furthermore, this assumes that only one received pseudorange corresponds with a fault. Therefore, the actual number of pseudoranges needed to perform traditional RAIM processing is N+5 pseudoranges where N is the number of faults. However, with the use of records grouped by common-mode bias, so long as a group has three total records, a fault can be correctly identified and removed. In fact, isolation of faults may even be performed in a group comprising two records if clock propagation is accurate enough to disambiguate. Indeed, if the post-fix residuals are high on a group of two pseudoranges, one can check which of the calculated biases best agrees with the predicted clock drift from the previous group of common bias pseudoranges. This may assume a short enough time span between fixes. Nevertheless, the above RAIM scheme allows for detection of a single fault in a group of two common bias pseudoranges when jointly processing a two or more groups of pseudoranges—regardless of time span between groups.

With returned reference to FIG. 1, in an embodiment, the receiver 120 may receive one or more records from another, adjacent receiver 170. For example, the adjacent receiver 170 may be in communication with the receiver 120 by way of a communication module 160. In turn, the adjacent receiver 170 may donate records to the receiver 120 which are also stored in the circular buffer 142. That is, an adjacent receiver 170 that may also be equipped to receive GNSS may be in operative communication with the communication module 160 of the receiver 120. In this regard, the communication module 160 may comprise a wired connection, an IEEE 802.11 (WiFi) connection, a Bluetooth connection, or any other communication means known in the art. The adjacent receiver 170 may receive signals that may or may not be capable of being received at the receiver module 122.

For example, the receiver 120 may be located at an interior of a building, but within communication range to the adjacent receiver 170 (e.g., a mobile device equipped with a GPS receiver) that is at a periphery of the building such as near a window or even outside of the building. In this regard, the adjacent receiver 170 may be capable of receiving signals that may or may not be attained by the receiver 120 (e.g., from more and/or different SVs). In this regard, the adjacent receiver 170 may communicate one or more records (e.g., including pseudorange, time reference, satellite location reference, or the like) to the receiver 120. In turn, the records from the adjacent receiver 170 may be grouped and assumed to have a common-mode bias. That is, the records received from the adjacent receiver 170 may be assumed to have a common-mode bias and grouped accordingly. As such, the adjacent receiver 170 may contribute records to be used in the processing to iteratively solve the equations provided above to determine the location of the receiver 120 and/or the common-mode bias for the various groups of records.

The recognition and use of adjacent devices 170 as contributors of records to the receiver 120 may at least in part be based on a determination that the adjacent receiver 170 is within a certain proximity to the receiver 120. In one regard, the devices may be in operative communication when within sufficient proximity. For example, both devices may be members of a common local area network such as a local area WiFi network or the like. Alternatively, the devices may be in proximity such that they are directly communicative such as by way of direct radiofrequency communication such as, for example, Bluetooth or some other appropriate communication protocol. Furthermore, the proximity of the adjacent receiver 170 to the receiver 120 may be estimated. In an embodiment, the distance between the adjacent receiver 170 and the receiver 120 may be estimated using a received signal strength indicator (RSSI). As such, if the distance between the adjacent receiver 170 and the receiver 120 is below a certain threshold, the receiver 120 and adjacent receiver 170 may be treated as being collocated. Additionally or alternatively, an estimated distance between the adjacent receiver 170 and the receiver 120 may also be used in the equations above to assist in trilateration with the understanding that the location of the adjacent device 170 is spaced away from the receiver 120 by a distance roughly corresponding to the estimated distance. The adjacent receiver 170 and the receiver 120 may have synchronized clocks (e.g., using a NTP server reference or the like). This may reduce a source of bias in relation to a clock offset between receiver 170 and receiver 120. However, if the receivers 170 and 120 are not synchronized, any resulting bias in the donated signals may be characterized by a unique bias value attributed to the donated signals.

The foregoing method may also provide reduced values of geometric dilutions of precision (GDOP). In this regard, GDOP is a known difficulty in trilateration of GNSS signals whereby if the sources of signals are all within a small portion of the sky, the GDOP increases. Thus, if the source of signals are far apart (i.e., span a larger portion of the sky), the GDOP decreases, thus, improving the precision of the resulting location derived from those signals. In the time-spread approach described herein, the GDOP value may decrease as the likelihood of acquiring signals from a large portion of the sky increases over time. For instance, even in the case of a single SV from which signals are received, the SV may traverse the sky over the course of a period of time such that signals received from the SV over a period of minutes, hours, or even longer, may provide a relatively broad portion of the sky from which signals are acquired, thus reducing the GDOP.

By way of example, horizontal dilutions of precision (HDOP) and vertical dilutions in precision (VDOP) are rarely less than 1 in traditional approaches that may average location fixes acquired over a time-spread. However, experiments employing embodiments of the method 200 described above have yielded HDOP and VDOP values less than 0.5 when a sufficient number of records have been collected spanning a sufficient period of time. Furthermore, use of the foregoing approach has demonstrated improved results over traditional methods. Specifically, when using 24 records in accordance with the foregoing approach, the precision of the resulting location was improved as compared to using six separate four record location determinations that were subsequently averaged to determine a location.

In another embodiment, the foregoing method 200 as described above could be used on a mobile device to perform joint processing in the event that the mobile device is or can be assumed to be stationary. For example, the mobile device may have accelerometers which may detect if the mobile device is stationary. In this regard, no acceleration may be a good indicator that it is safe to assume the mobile device is stationary. Furthermore, attenuated signals may also be a good indicator of being stationary. During a stationary periods at the mobile device, 2 or more signals could be acquired. Corresponding records could also be stored as described above. In this regard and as described above, groups of two or more records ranges taken at different times that may potentially have different biases (e.g., due to mobile device oscillator biases) may be assumed be have been taken at a common location and the joint processing may give a much better location determination than if individual determinations were attempted. Moreover, the traditional approach to location determination may in fact fail if fewer than four simultaneous signals cannot be received. In this approach, the devices may have 1 milli-second grade absolute time to associate a satellite positions with the pseudorange (as would be necessary for Medium Earth Orbit Satellites such as GPS/Galileo/Glonass). This can be done with a time-synced node (e.g., via a NTP Server or other technique used for node synchronization).

Furthermore, if the mobile device includes accelerometers, an integrated path giving the vector difference between two positions having different biases may be subtracted out during the processing 240 by rotating between local coordinates and the earth-centered, earth-fixed (ECEF) frame for the satellite positions. A rough initial position (e.g., within 10 km) is sufficient for an initial ECEF to local coordinate frame (such as east, north, up (ENU) coordinates) transformation.

Furthermore, a network may be constructed of two or more positioning devices with a wired or wireless link allowing them to share pseudorange record information as described above in relation to the receiver 120 and the adjacent receiver 170. Additionally, if it is assumed that the relative vector offsets between each of the receivers in the network are known or could be calculated via RF ranging, then all shared pseudorange records across all networked receivers could be jointly processed thereby enhancing the positioning quality of the data arriving at any single receiver. Note that these receivers can be synchronized to within a few nano seconds (e.g., in a LAN via IEEE 1588 or the like) although this is not necessary.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for a receiver used with a positioning system, the method comprising:
    establishing a duration of an observation time period, wherein signals received from the positioning system at the receiver within the duration of the observation time period are subject to a common-mode bias;
    saving a plurality of records for at least one observation time period, wherein the plurality of records each correspond to a corresponding signal received at the receiver from the positioning system during the duration of the at least one observation time period;
    receiving, at the receiver from an adjacent receiver, a plurality of donated signals received at the adjacent receiver, wherein each of the plurality of donated signals are grouped into a common observation time period subject to a common-mode bias of the adjacent receiver; and
    solving for the common-mode bias corresponding to the observation time period using the plurality of records for the at least one observation time period, wherein the solving includes solving for the common-mode bias of the plurality of donated signals from the adjacent receiver.

2. The method according to claim 1, wherein the receiver is stationary.

3. The method according to claim 2, wherein the duration of the observation time period is at least partially based on a stability measure of a local oscillator at the receiver.

4. The method according to claim 3, wherein the common-mode bias is used to correct drift of the local oscillator.

5. The method according to claim 3, wherein the duration of the observation time period is at least partially based on a predetermined precision measure.

6. The method according to claim 1, wherein the solving operation further comprises:
    determining a set of predicted pseudorange errors;
    equating the predicted pseudorange errors to a corrected change in position as determined based on the signals received during the observation time period; and
    calculating the common-mode bias by solving for a common-mode bias term to maintain equality between the predicted error and the corrected change in position.

7. The method according to claim 1, wherein the saving operation further comprises:
    saving a plurality of groups of records each corresponding to a plurality of observation time periods, wherein each of the records in each respective one of the plurality of groups correspond to a signal at the receiver from the positioning system during a corresponding one of the observation time periods;
    wherein each record of a respective group of the plurality of groups of records comprises a common-mode bias value.

8. The method according to claim 7, wherein the solving operation further comprises:
    solving for the common-mode bias value for each of the plurality of groups using corresponding records from each of the plurality of groups of records.

9. The method according to claim 8, wherein the plurality of records for each of the plurality of groups are stored in a circular buffer, wherein the plurality of records for the oldest observation time period is overwritten by a plurality of records for a new observation time period during each successive observation time period.

10. The method according to claim 8, further comprising:
    applying a receiver autonomous integrity monitoring process to each of the plurality of observation time periods to remove at least one record from the plurality of records, wherein the removed record corresponds to a fault associated with a received signal from the positioning system.

11. The method according to claim 10, wherein the plurality of observation time periods extends over a period of not less than 4 hours.

12. The method according to claim 10, wherein the plurality of observation time periods extends over a period of not less than 24 hours.

13. The method according to claim 12, wherein the dilution of precision measure for a location determined utilizing the signals received at the receiver from the positioning system and the common-mode bias information for the plurality of observation time periods is less than 1.

14. The method according to claim 1, further comprising:
    compensating the signals received during the observation time period using the solved common-mode bias for the observation time period to generate corrected signals; and
    utilizing the corrected signals to resolve a position of the receiver.

15. The method according to claim 14, wherein the utilizing includes corrected signals from a plurality of observation time periods.

16. The method according to claim 1, wherein the proximity to the adjacent receiver is ascertained via a communication channel between the receiver and the adjacent receiver.

17. The method of claim 1, where the position of adjacent receivers relative to the receiver is known.

18. The method of claim 17, wherein the position of adjacent receivers relative to the receiver is determined by way of a received signal strength indicator (RSSI).

19. The method of claim 1, further comprising:
    receiving, at the receiver from the adjacent receiver, a plurality of donated signals received at the adjacent receiver at a subsequent time, wherein the adjacent receiver is at a different location at the subsequent time and the different location is related to a prior location of the adjacent receiver by way of integration of inertial measurements.

20. The method of claim 1, further comprising:
    receiving, at the receiver from a plurality of adjacent receivers, a corresponding plurality of donated signals received at the respective adjacent receivers, wherein the plurality of adjacent receivers positions offset relative to the receiver is known from wireless ranging.

21. The method of claim 1, wherein the adjacent receiver is time synchronized with the receiver.

22. The method of claim 21, wherein the donated signals from the adjacent receiver are received in relation to a synchronized clock of the receiver.

* * * * *